United States Patent
Kudryavtsev et al.

(10) Patent No.: US 8,407,237 B1
(45) Date of Patent: Mar. 26, 2013

(54) SYSTEM AND METHOD OF CONNECTING LEGACY DATABASE APPLICATIONS AND NEW DATABASE SYSTEMS

(75) Inventors: Vladimir Kudryavtsev, Quebec (CA); Nenghong Fu, Dollard-des-Ormeaux (CA)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/331,838

(22) Filed: Dec. 20, 2011

(51) Int. Cl.
*G06F 17/30* (2006.01)
(52) U.S. Cl. ......... 707/762; 707/803
(58) Field of Classification Search ........ 707/999.1, 707/762, 803
See application file for complete search history.

(56) References Cited

U.S. PATENT DOCUMENTS

| | | | |
|---|---|---|---|
| 6,081,811 A * | 6/2000 | Nilsson | 1/1 |
| 6,240,417 B1 * | 5/2001 | Eastwick et al. | 707/762 |
| 7,478,111 B2 * | 1/2009 | Tong et al. | 1/1 |
| 2005/0050076 A1 * | 3/2005 | Tong et al. | 707/100 |
| 2005/0102156 A1 * | 5/2005 | Linduff | 705/1 |
| 2006/0235899 A1 * | 10/2006 | Tucker | 707/200 |
| 2007/0179983 A1 * | 8/2007 | Putman | 707/200 |
| 2010/0268552 A1 * | 10/2010 | Schoenberg et al. | 705/3 |

* cited by examiner

*Primary Examiner* — Robert Beausoliel, Jr.
*Assistant Examiner* — Noosha Arjomandi
(74) *Attorney, Agent, or Firm* — Fountainhead Law Group PC (57) ABSTRACT

A system and method of connecting legacy database applications and new database systems. The method includes parsing SQL scripts by a connector program. In this manner, the legacy application system does not have to be replaced to work with the new database system.

20 Claims, 4 Drawing Sheets

SYSTEM AND METHOD OF CONNECTING LEGACY DATABASE APPLICATIONS AND NEW DATABASE SYSTEMS

CROSS REFERENCE TO RELATED APPLICATIONS

Not applicable.

BACKGROUND

1. Field of the Invention

The present invention relates to report generation for databases, and in particular, to SQL (structured query language) scripts in report generation.

2. Description of the Related Art

Unless otherwise indicated herein, the approaches described in this section are not prior art to the claims in this application and are not admitted to be prior art by inclusion in this section.

Report generation is a common task in database applications, for example to perform business intelligence activities. Reports may be generated according to a schedule for business managers to use when making business decisions. Thus a particular report may be developed once, and may be run as desired to produce a report according to the latest data in the database. A report generally includes formatting instructions and SQL (structured query language) scripts; the SQL scripts select the appropriate data from the database, and the formatting instructions format the results of the SQL scripts in a desired manner.

In general, the database applications are executed by an application server and the data is stored in a database implemented by a database server. A particular database application (or set of applications) may be configured to interface with various types of database servers (or database systems). More specifically, a particular database server (or database system) may have its own specific implementation of SQL ("native SQL"); the database applications may be written using SQL that is not specific to a particular implementation ("open SQL"), and may then use an interface to translate the open SQL into the native SQL.

As an example, the NetWeaver system from SAP AG implements the ABAP (Advanced Business Application Programming) language for database applications and reports. The NetWeaver system may use a number of database systems, including IBM DB2, Informix, MaxDB, Oracle, and Microsoft SQL Server. Thus for a specific NetWeaver system that uses an Oracle database, the NetWeaver system includes an interface for translating the open SQL of ABAP programs into the native SQL implemented by the Oracle database.

A new type of database interface introduced recently is Java™ Database Connectivity (JDBC). In order to implement the functionality of existing database applications with new database systems that use JDBC, one approach is to rewrite the existing database applications (e.g., the SQL scripts) to use JDBC instead.

SUMMARY

However, rewriting existing database applications to use JDBC is a time consuming task. First, evaluation time must be spent to compare the performance of a query using the existing (legacy) database system with a JDBC-formatted query using the new database system, to determine whether development resources should be spent to convert the existing database applications to use JDBC. Second, development time must be spent to convert the SQL scripts of the existing database applications to JDBC-formatted SQL scripts. Third, user time must be spent to learn JDBC-formatted script writing, since users will no longer be able to use only their existing experience (which relates to writing scripts for the legacy system).

An embodiment of the present invention is directed toward a connector program for interfacing between existing database applications that have a legacy database interface and a new database system that was not originally interoperable with the existing database applications or the legacy database interface.

The connector program enables two general use cases: prototyping and reporting. Regarding prototyping, the database applications may use the connector program to test selected SQL scripts on the new database system and to compare the performance versus the SQL scripts executed by the legacy database system. The performance increase may then suggest that resources should be spent to translate the database application to use the new type of database system directly. This feature offers improvement over spending resources to convert the existing database applications to use the new database system without knowing the resulting benefits.

Regarding reporting, the connector program enables the database applications to send selected existing SQL scripts that can run on the new database to the new database system instead of to the legacy database system. The results of the SQL scripts may then be stored in a shared memory area as with the results of SQL scripts processed by the legacy database system. Then other users can use the results (of the SQL scripts processed by the new database system) as they did with the results from the legacy database system. The users then have the performance benefit of using the new database system without any effort on the part of the users. In addition, there is no need for developers to spend development time to rewrite the SQL scripts to use the new database system.

According to an embodiment, the database applications are written in ABAP and the new database system is configured to use Java™ Database Connectivity (JDBC).

One embodiment is a method of connecting legacy database applications and new database systems. The method includes storing, by an application server, a legacy database application. The legacy database application is configured to interface with a legacy database system and includes SQL scripts. The SQL scripts are written in an open SQL format. The method further includes implementing, by the application server, a configuration table and a shared memory area. The method further includes receiving, by the application server, a selected SQL script, selection parameters, and a database parameter. The selected SQL script is one of the SQL scripts, and the database parameter indicates one of the legacy database system and a new database system. The method further includes storing, by the application server in the configuration table, the selected SQL script, the selection parameters and an identifier. The identifier uniquely identifies the selected SQL script and the selection parameters. The method further includes connecting, by a connector program, to the application server when the database parameter indicates the new database system. The method further includes reading, by the connector program, the SQL script and the selection parameters according to the identifier. The method further includes processing, by the connector program, the SQL script to generate a parsed SQL script. The processing parses the open SQL format to a new format that is used by the new database system. The method further includes executing, by the connector program, the parsed SQL script using the selection parameters to extract data from the new database system. The method further includes writing, by the connector program, the data from the new database system into the shared memory area using the identifier. The method further includes displaying, by the application server, the data from the new database system in the shared memory area according to the identifier.

The method may further include connecting, by the application server, to the legacy database system when the database parameter indicates the legacy database system. The method may further include executing, by the application server, the selected SQL script using the selection parameters to extract second data from the legacy database system. The method may further include writing, by the application server, the second data from the legacy database system into the shared memory area using the identifier.

The method may further include communicating, by the application server to the connector program, that the selected SQL script and the identifier have been stored in the configuration table.

The new database system may have an ODBC or a JDBC interface.

The method may further include displaying, by the application server, the data from the new database system in the shared memory area to a second user according to the identifier, without again extracting the data from the new database system.

A computer system may operate to implement the method described above. The computer system may store, execute or be otherwise controlled by one or more computer programs that control the computer system to implement the method described above. The computer system may include an application server, a new database system, and a connector program.

A non-transitory computer readable medium may store instructions to control a computer system to perform the method described above. The instructions may include an application server component and a connector program component.

The following detailed description and accompanying drawings provide a better understanding of the nature and advantages of the present invention.

DETAILED DESCRIPTION

Described herein are techniques for connecting legacy database applications and new database systems. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

In this document, various methods, processes and procedures are detailed. Although particular steps may be described in a certain sequence, such sequence is mainly for convenience and clarity. A particular step may be repeated more than once, may occur before or after other steps (even if those steps are otherwise described in another sequence), and may occur in parallel with other steps. A second step is required to follow a first step only when the first step must be completed before the second step is begun. Such a situation will be specifically pointed out when not clear from the context. A particular step may be omitted; a particular step is required only when its omission would materially impact another step.

In this document, the terms "and", "or" and "and/or" are used. Such terms are to be read as having the same meaning; that is, inclusively. For example, "A and B" may mean at least the following: "both A and B", "only A", "only B", "at least both A and B". As another example, "A or B" may mean at least the following: "only A", "only B", "both A and B", "at least both A and B". When an exclusive-or is intended, such will be specifically noted (e.g., "either A or B", "at most one of A and B").

In this document, various computer-implemented methods, processes and procedures are described. It is to be understood that the various actions (receiving, storing, sending, communicating, displaying, etc.) are performed by a hardware device, even if the action may be authorized, initiated or triggered by a user, or even if the hardware device is controlled by a computer program, software, firmware, etc. Further, it is to be understood that the hardware device is operating on data, even if the data may represent concepts or real-world objects, thus the explicit labeling as "data" as such is omitted. For example, when the hardware device is described as "storing a record", it is to be understood that the hardware device is storing data that represents the record.

Figure 1:
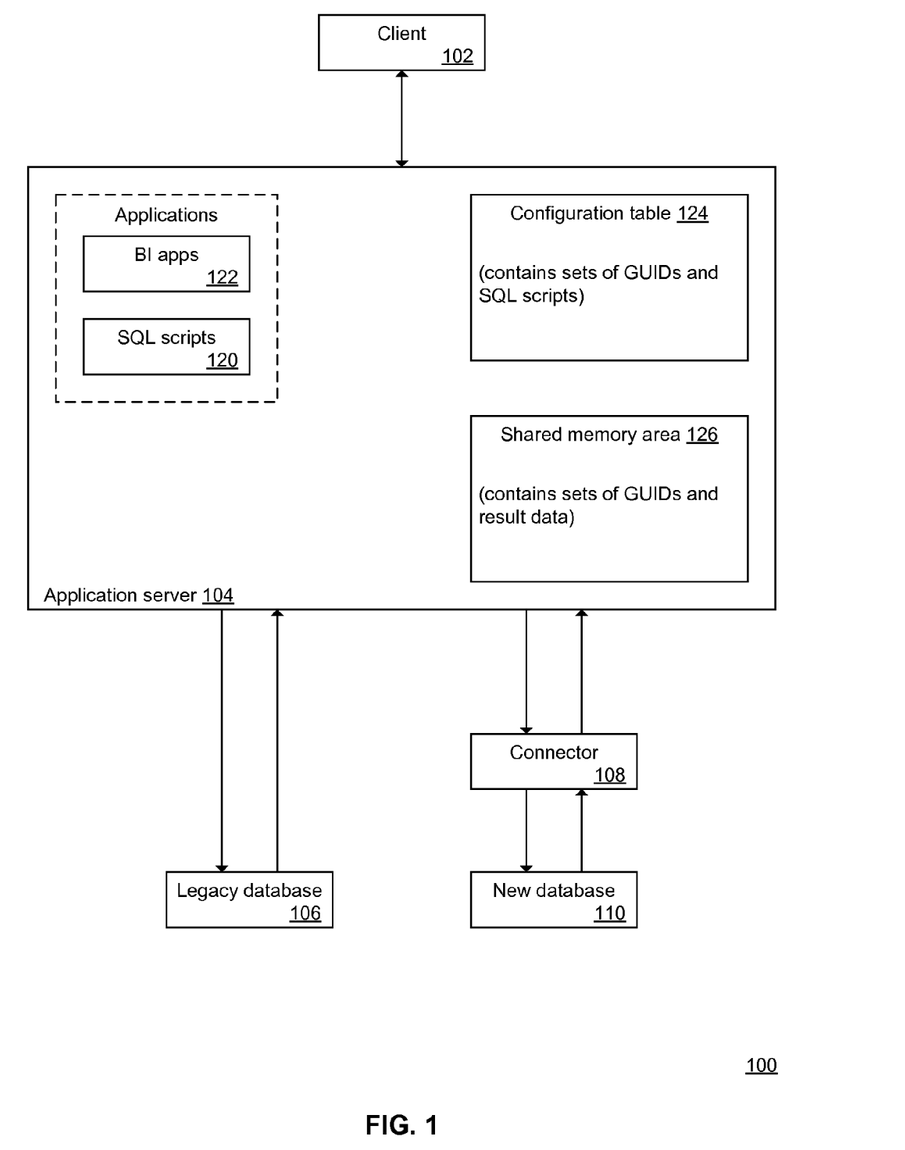
FIG. 1 is a block diagram of a business intelligence system.

FIG. 1 is a block diagram of a business intelligence system 100. The business intelligence system 100 includes a client 102, an application server 104, a legacy database system 106, a connector program 108, and a new database system 110. The business intelligence system 100 may be implemented by one or more hardware computing devices, depending upon the data processing needs of the business intelligence system 100. For example, when numerous users are using the business intelligence system 100, the client 102 may be one of a number of client computers. When the numerous users are at multiple locations, the application server 104 may be implemented by a hardware device different than that used to implement one of the clients. The application server 104 may be implemented by one or more hardware servers depending upon various factors such as redundancy, processing load, etc. The legacy database system 106 may be implemented by one or more hardware devices depending upon various factors such as the vendor of the legacy database system 106, the size of data stored by the legacy database system 106, etc. The connector program 108 may be executed by the same hardware server that implements the application server 104. The new database system 110 may be implemented by one or more hardware devices depending upon various factors such as the vendor of the new database system 110, the size of data stored by the new database system 110, etc. In an evaluation or prototyping environment, the new database system 110 may be implemented as a shared cloud computing resource, a portion of which is allocated to serving the needs of the application server 104. A network (not shown) connects the various hardware devices that make up the business intelligence system 100. Further details of the hardware devices that make up the business intelligence system 100 are provided in FIG. 4.

The business intelligence system 100 generally implements a three-tier architecture that includes a presentation tier (the client 102), an application tier (the application server 104), and a database tier (the legacy database system 106 and the new database system 110).

The client 102 generally provides a user interface for interacting with the business intelligence system 100. For example, a user may use the client 102 to create reports, to instruct the application server 104 to run the reports, to display the results of running the reports, etc.

The application server 104 generally stores and executes database applications that relate to business intelligence. For example, if a particular user is interested in particular data to make a business decision, the application server 104 may execute database applications for creating a report (or for modifying an existing report), may execute the report to select and display the data, and may store the report for reuse in the future (e.g., when the underlying data has changed). More specifically, the application server 104 includes SQL scripts 120, business intelligence applications 122, a configuration table 124, and a shared memory area 126.

The SQL scripts 120 generally create reports. The SQL scripts 120 include SQL statements and formatting statements. The SQL statements generally control the selection of data, and the formatting statements generally control the display of the data. The SQL statements may be written in open SQL format. The SQL scripts 120 may be passed parameters that the SQL scripts 120 operate on. For example, a particular SQL script "SUM" may select from table X1 in database X2 the sum of the data in the column X3 between dates X4 and X5; values for the parameters X1, X2, X3, X4 and X5 are passed to the script as inputs. The application server 104 may store many SQL scripts 120 that have been developed over time to address the variety of business intelligence queries of the enterprise. As another example, the user can create a function that finds average sales data for the past year, organized by region or other parameters, that generates output results in the target database. The SQL statement to call such function is another example of part of the SQL scripts 120.

The business intelligence applications 122 generally include multiple SQL scripts 120 to generate more complex reports. For example, the SQL scripts 120 may include Script 1 that generates a selection by product line, and Script 2 that generates a selection by manufacturing location. The business intelligence applications 122 then may include applications that arrange the SQL scripts 120 in various ways. For example, Application 1 executes Script 1 then Script 2 and generates a report in Format 1; Application 2 executes Script 2 then Script 1 and generates a report in Format 2; etc. As another example, Application 3 executes Script 1 and Script 2, compares the results, and accepts user input; based on the user input, the application executes Script 3, executes Script 4, or repeats Script 1 with different parameters, and generates a report in Format 3.

The configuration table 124 generally stores instances of the SQL scripts 120. An instance of an SQL script includes the SQL script itself and a specific set of parameters. For example, the "SUM" script (discussed above) using the parameters of the PRODUCTS table in the NORTH AMERICA database, the column NET SALES, and the dates Jan. 1, 2000 through Jan. 31, 2000, would be an instance of the SUM script. Each instance is stored with a unique identifier, referred to as a globally unique identifier (GUID). This allows instances to be saved and reused as needed, without requiring scripts to be re-run (except when desired, for example when the underlying data has changed). For example, when a second user wants to run the SUM script using the same parameters as the first user, the application server 104 need only access the corresponding instance as identified by the GUID, instead of re-running the script.

The shared memory area 126 generally stores the results of the SQL scripts 120. These results are associated with the GUIDs of the SQL scripts 120 stored in the configuration table 124. Adding more specifics to the example discussed above, when the second user wants to run the SUM script using the same parameters as the first user, the application server 104 sees that instance in the configuration table 124 and uses the GUID to access the results stored in the shared memory area 126.

The legacy database system 106 generally implements a database system. The database system 106 may be a relational database system, an object-oriented database system, etc. Examples of the database system 106 include SAP Sybase DB, IBM DB2, Informix, MaxDB, Oracle and Microsoft SQL Server. The database system 106 is referred to as the "legacy" database system because the application server 104, the SQL scripts 120 and the applications 122 are configured to operate with the database system 106. (In contrast, the application server 104, the SQL scripts 120 and the applications 122 are not configured to operate with the new database system 110, hence the connector program 108 is used.)

The new database system 110 generally implements a database system that differs in type from the legacy database system 106. The database system 110 may be a column store database system, an in-memory database system, etc. Examples of the database system 100 include the SAP HANA system from SAP AG, Oracle TimesTen In-Memory Database, IBM SolidDB, and Microsoft New SQL Server. The database system 110 is referred to as the "new" database system because often the type of the database system 110 was not in existence when the application server 104 was implemented, so that it was not possible at that time to configure the application server 104 to operate with the database system 110. The "type" of database generally refers to the interface that the database 110 has for connecting to other systems (e.g., to the application server 104). Examples of the types of interfaces used by the new database 110 include the Open Database Connectivity (ODBC) interface and the Java™ Database Connectivity interface (JDBC). As mentioned above, the application server 104 is not configured to operate with the new database system 110, or more specifically, is not configured to interface with an ODBC interface or a JDBC interface. Thus one way to connect the application server 104 and the new database system 110 is to upgrade the application server 104 to support direct connection to the new database system 110 and rewrite the SQL scripts 120 and the applications 122 to use an ODBC interface or a JDBC interface; but the upgrade has to be done before any implementation starts. In contrast to upgrading, the connector program 108 may be used.

The connector program 108 generally connects the application server 104 (more specifically, the SQL scripts 120 and the applications 122) and the new database system 110. As mentioned above, the application server 104 is configured to operate with the legacy database system 106. Thus one way to connect the application server 104 and the new database system 110 is to upgrade the application server 104 and rewrite the SQL scripts 120 and the applications 122 to use the new database system 110. In contrast to upgrading, the connector program 108 may be used. As compared to upgrading, the connector program 108 increases the efficiency of evaluation, development and operation of the business intelligence system 100 without disruption of current existing function and systems. Regarding evaluation, the benefits of using the new database system 110 instead of the legacy database system 106 may be evaluated without spending resources on upgrading and rewriting all the SQL scripts (because only scripts under evaluation need to be rewritten). Further details of the operation of the connector program 108 are provided in subsequent paragraphs.

Figure 2:
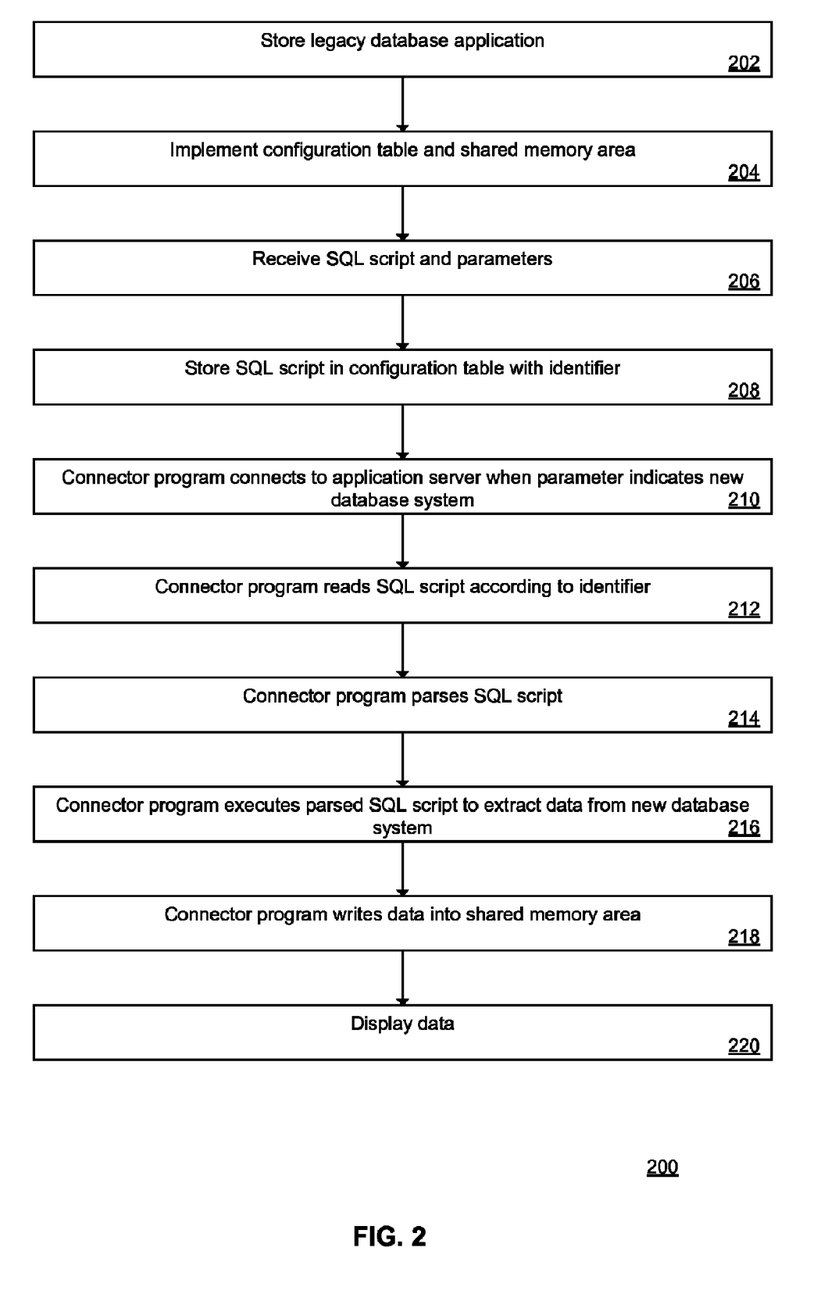
FIG. 2 is a flowchart of a method of connecting legacy database applications and new database systems.

FIG. 2 is a flowchart of a method 200 of connecting legacy database applications and new database systems. The method 200 may be performed by the application server 104 and the connector program 108, for example as controlled by one or more computer programs. The method 200 may be performed by one or more hardware devices (see FIG. 4) that implement the application server 104 and the connector program 108.

At 202, an application server stores a legacy database application. The legacy database application is configured to interface with a legacy database system. The legacy database application includes one or more SQL scripts. The SQL scripts may be written in an open SQL format. For example, the application server 104 stores the legacy application as one of the applications 122, which include one or more of the SQL scripts 120.

At 204, the application server implements a configuration table and a shared memory area. For example, the application server 104 implements the configuration table 124 and the shared memory area 126.

At 206, the application server receives a selected SQL script, selection parameters, and a database parameter. The reception of these items generally results from user input (e.g., via the client 102). The selected SQL script is one of the SQL scripts 120. The database parameter indicates one of the legacy database system and a new database system. For example, if the user wants to run the script using the legacy database system 106, the user indicates one selection for the database parameter; if the user wants to run the script using the new database system 110, the user indicates another selection for the database parameter.

For example, one of the applications 122 may be a graphical interface for a form in which the user enters the SQL script name and the table on which the script is to be executed. The default for the form is that the database parameter indicates the new database system. The client 102 displays the form as part of its operation with the application server 104 (e.g., data exchange using the http protocol). The user enters information as desired, for example to evaluate the performance of the new database system 110 on existing scripts.

At 208, the application server stores in the configuration table the selected SQL script, the selection parameters and an identifier. The identifier uniquely identifies the selected SQL script and the selection parameters. For example, the application server 104 may store the instance of the selected SQL script in the configuration table 124 with a unique GUID.

At 210, a connector program connects to the application server when the database parameter indicates the new database system. For example, when the user enters the database parameter to select the new database (see 206), the application server 104 may perform the step 208 and then inform the connector program 108 that it is ready to receive a connection by providing the GUID to the connector program 108.

At 212, the connector program reads the SQL script and the selection parameters according to the identifier. For example, when the application server 104 provides a GUID to the connector program 108, the connector program connects to the application server 104 and uses the GUID to read the instance of the SQL script from the configuration table 124.

At 214, the connector program parses the SQL script to generate JDBC statements and execute them in a target database. As discussed above, the application server 104 is configured to operate with the legacy database system 106, and not the new database system 110, so the SQL scripts 120 (even when written in an open SQL format) will not operate with the new database system 110.

At 216, the connector program executes the parsed SQL script (set of JDBC statements) using the selection parameters to extract data from the new database system. For example, a new SUM script (corresponding to the SUM script discussed above having been transformed in 214) is executed by the connector program 108 by sending a query to the new database system 110 using the selection parameters provided by the user at 206. The connector program 108 then receives from the new database system 110 the results of the query.

At 218, the connector program writes the data from the new database system into the shared memory area using the identifier. For example, using the GUID from the application server 104 at 212, the connector program 108 connects to the application server 104 and writes the results of the query (from 216) into the shared memory area 104. The data is then available to all of the clients 102 to access on the application server 104 via the applications 122 or the SQL scripts 120, without the need for them to rerun the script, to generate their own instance of the script, or to extract again the data from the new database system.

At 220, the application server displays the data from the new database system according to the identifier. For example, the application server 104 uses the GUID assigned in 208 to access the shared memory area 126; the connector program 108 stored the results of the query in the shared memory area 126 using the GUID in 218; the results are then available for the application server 104 to display, for example by serving a web page to the client 102.

As discussed above regarding FIG. 1, the application server 104 often also interfaces with the legacy database system 106. One example is an evaluation scenario. In an evaluation scenario, the user is evaluating whether to replace the legacy database system 106 with the new database system 110. Part (or all) of the data stored by the legacy database system 106 is also replicated to the new database system 110, and the user runs a SQL script on both systems. More specifically, at 206 the user sets the selection parameter to select the legacy database system. Then the application server connects to the legacy database system, executes the SQL script to extract the data from the legacy database system, and writes the data from the legacy database system in the shared memory. This data is associated with a separate GUID, and the user can then compare these results with those obtained by using the new database system (steps 202-220).

Further details of the operation of the connector program are provided below with reference to FIG. 3.

Figure 3:
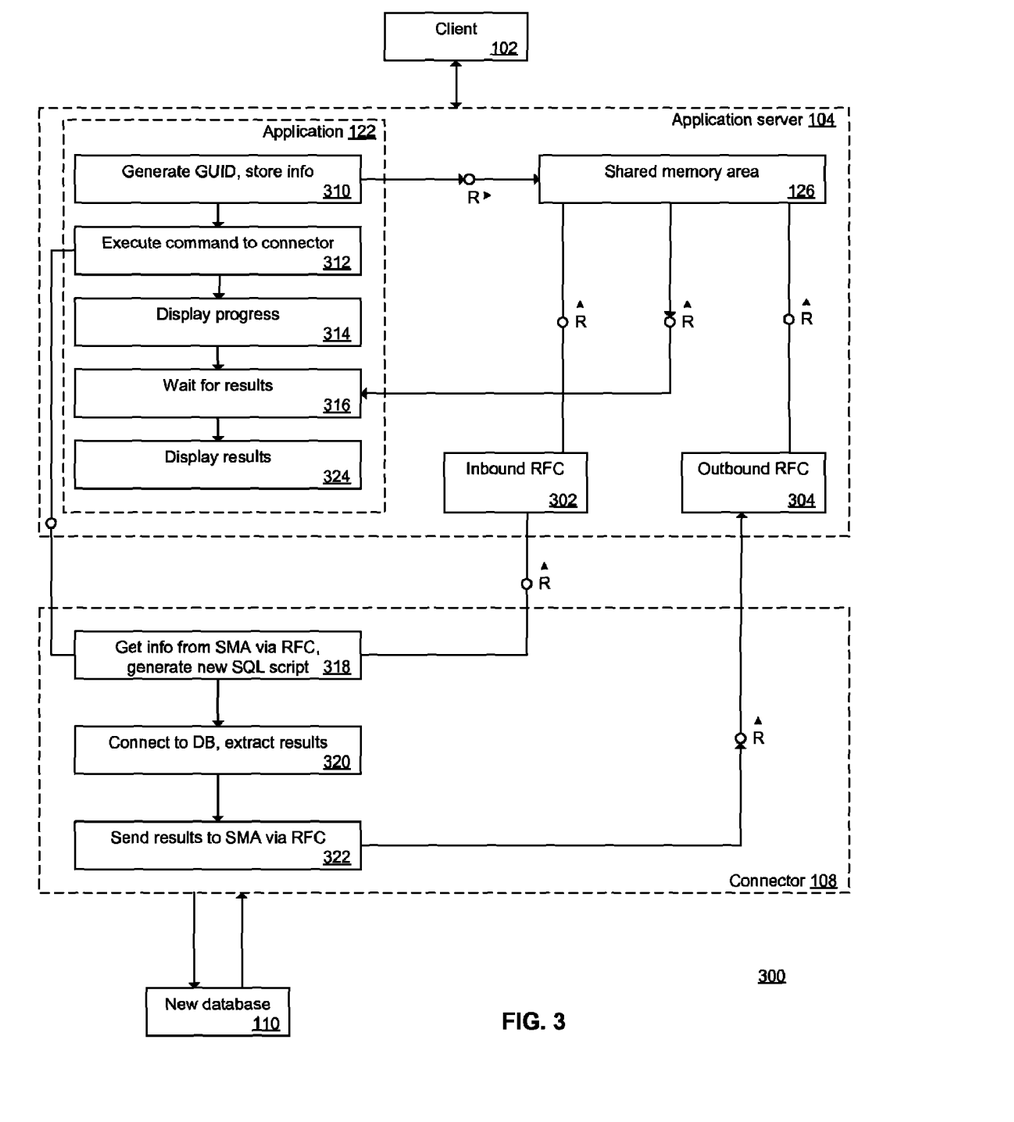
FIG. 3 is a block diagram that shows the data processing flow between the application server 104 and the connector 108 (see FIG. 1), in the context of the method of FIG. 2.

FIG. 3 is a block diagram that shows the data processing flow 300 between the application server 104 and the connector 108 (see FIG. 1), in the context of the method 200 of FIG. 2. In the diagram, each circle represents a demarcation between separate functions, programs, devices, objects or actors. Each "R" represents a request/response pair, for example a request for data by one function and the data itself in response by the other function. Each arrow by an R points in the direction of the main data flow.

The application server includes the application 122 and the shared memory area 126 (see FIG. 1), as well as an inbound remote function call (RFC) 302 and an outbound RFC 304.

The application 122 used as an example in the data processing flow 300 may include a web form that the application server 104 generates and serves to the client 102. The web form includes input areas for the user to enter the name of the SQL script to be executed and the parameters to use for that SQL script, such as the database to be accessed, the table to query, etc. The web form may default to selection of the new database system 110 with the assumption that the user is already familiar with the performance of the SQL script on the legacy database system 106. Alternatively the web form may include a radio button or other selection tool for the user to select which of the legacy database system 106 and the new database system 110 to use.

At 310, the application 122 generates an identifier (e.g., a GUID) for the selected SQL script and associated parameters (e.g., that the user has entered into the web form described above), and stores the identifier, the SQL script and the associated parameters in the shared memory area 126 (e.g., as an instance of the SQL script).

At 312, the application 122 executes a command to activate the connector program 108. The command may be at the operating system level, either on the frontend of the user or on the application server 104, and includes the parameters such as application server address, inbound RFC name, host name, system number, client, GUID, new target database connection information (new database server address, port number, user name, password), etc. The command may be sent after the application 122 has stored the SQL script in the shared memory area (see 310). The connector program 108 receives the command and performs the processing at 318, 320 and 322 below.

At 314, the application 122 displays a message to the user that the SQL script is being processed. For example, the application server 104 may serve to the client an updated page with a message or that shows the progress of processing the script.

At 316, the application 122 waits for the connector program 108 to complete processing of the SQL script. For example, after the connector program 108 has placed the results in the shared memory area 126 (see 322 below), the connector program 108 may set a flag that tells the application 122 to stop waiting and to proceed to 324.

At 318, the connector program 108 sends a request to the application server 104 via the inbound RFC 302, using the GUID and address/port (see 312), to access the SQL script and parameters in the shared memory area 126. The inbound RFC 302 reads the configured SQL script information from the shared memory area 126 based on the provided GUID, and retrieves the SQL scripts and associated variables from the configuration table based on the information read from the shared memory area 126. The connector program 108 requests the following information via the inbound RFC 302: the configured SQL script and associated parameters, such as query ID, query type, query statement, variable type, variable value, output table name, and the outbound RFC name to send the result (which also has the expected result structure(s) as output table defined). The connector program 108 then parses the SQL script and parameters into the format used for connecting to the new database system 110 (e.g., ODBC format, JDBC format, etc.).

At 320, the connector program 108 dynamically establishes a connection to the new database system 110 (e.g., ODBC, JDBC, etc.) and executes the parsed SQL statements in the new database system 110 using the connection. The new database system 110 provides the results of the SQL statements to the connector program 108 via the connection.

At 322, the connector program 108 sends the results (see 320) to the application server 104 via the outbound RFC 304. The outbound RFC 304 serves as a data definition provider, storing the results in the shared memory area 126 according to the GUID.

At 324, the application 122 displays the results to the user (e.g., by instructing the application server 104 to serve a web page to the client 102) or passes the results on to other applications for further processing, by accessing the shared memory area 126 using the GUID. The application 122 may also display an elapsed time measurement or other comparison information for the user to compare the performance of the SQL script on the new database system 110 with that of the legacy database system 106.

The connector program 108 enables one or more features that differentiate the business intelligence system 100 over existing systems. One feature is that it enables connection to new types of database systems (e.g., ODBC, JDBC, etc.) without requiring an upgrade to the application server 104. Another feature is that it does not require developers to rewrite the all applications 122, but only needs to rewrite or resend evaluated SQL scripts. Another feature is that it enables the application server 104 to make a dynamic connection, during runtime, to the new database system 110. By preloading supported JDBC drivers for all new databases in build time, it can establish dynamic JDBC connection to the new database in the run time when application 122 executes a command to connector program 108 by passing the new database connection information. Another feature is that it enables the use of command-line execution of Java™ files and eliminates the need of an additional Java™ stack and server. (Adding an additional Java™ stack or additional server would require reprogramming the application server 104 or reinstalling a new application server, which would increase the total cost of ownership.)

Additional Details

One feature of certain embodiments is the use of "type" statement definitions to generate JDBC requests dynamically. The types include query, function, update and batch. The query type is a statement that contains variables. The function type is a statement that may return multiple tables or multiple table names as a result. The update type is a statement that is to be processed as a database update. The batch type is a set of statements that may be processed without intermittent interaction between the connector program 108 and the target database (e.g., the new database system 110) for optimal performance. The system 100 may assume a query type as a default. The connector program 108 may account for the type when parsing the SQL scripts. The type may be associated with the SQL scripts stored in the shared memory area 126. In summary, the SQL script parsed in the format of the target system (e.g., the new database system 110), together with the type, may be used when establishing the JDBC connection (see 320 in FIG. 3).

Another feature of certain embodiments is that the connector program 108 uses the service or RFC specification and the table name variable stored in the shared memory area 126 to parse the JDBC result set from the target system (e.g., the new database system 110) into the expected result table stored in the shared memory area 126. When the outbound RFC name is provided to the connector program 108, it requests the structures of tables used by the RFC (e.g., the outbound RFC 304); when the connector program 108 receives the results from the target system, the connector program 108 attempts to match them by field(s) and table name(s). The connector program 108 may be configured with information matching the result structures, fields and table names when the user is selecting the SQL scripts to be executed; this configuration information may be stored in the shared memory area 126 and communicated to the connector program 108 via the inbound RFC 302. Once the connector program 108 determines the output table name, it is able to get all the field names of the table from the shared memory area 126 via the inbound RFC 302 (e.g., using a Java™ Connector API), and to perform the matchings.

The service or RFC specification refers to the specification of the parameters of the service in a manner that is accessible to Java™ programs. The inbound RFC 302 and outbound RFC 304 use these when exchanging data between the application server 104 and the connector program 108, for example by using a Java™ Connector API.

Figure 4:
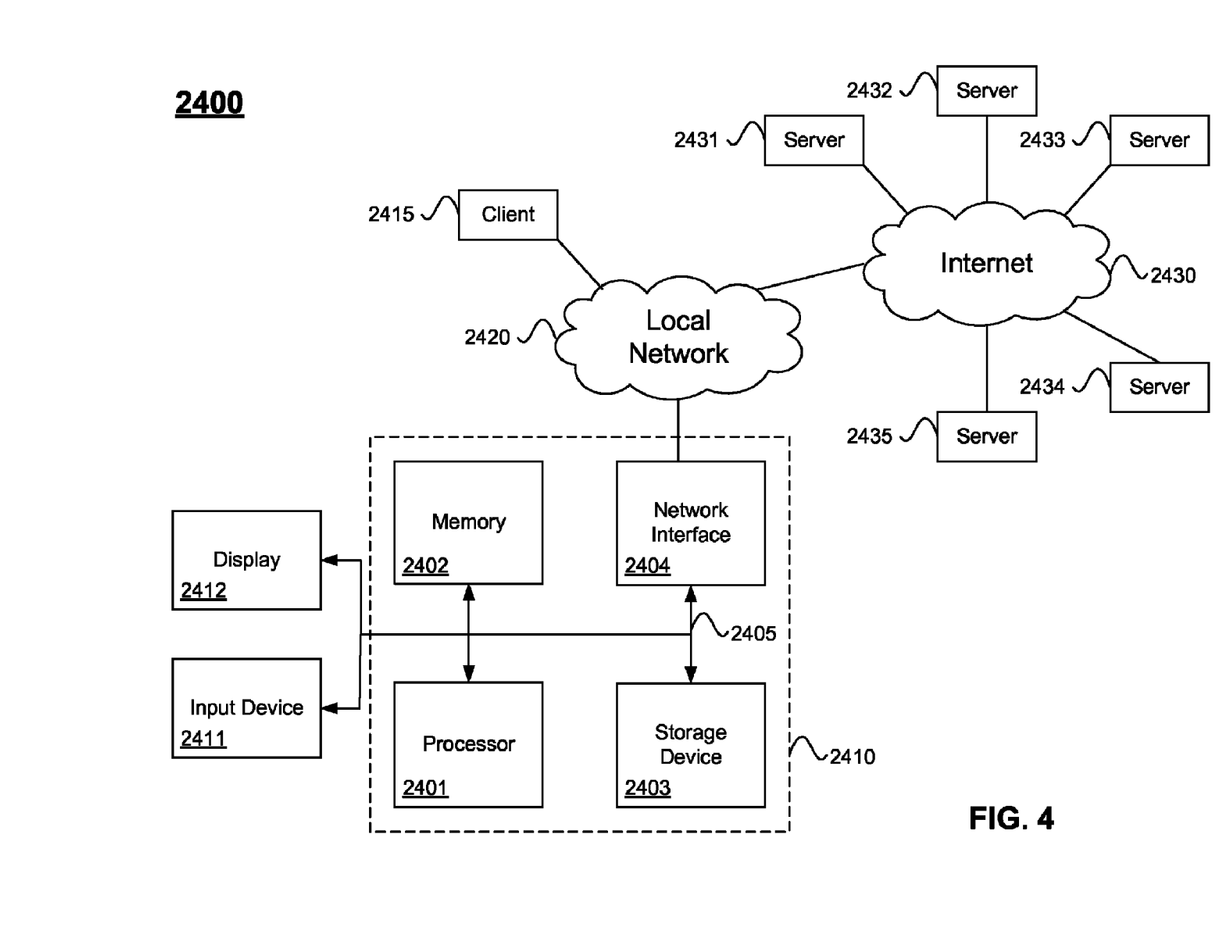
FIG. 4 is a block diagram of an example computer system and network for implementing embodiments of the present invention.

FIG. 4 is a block diagram of an example computer system and network 2400 for implementing embodiments of the present invention. Computer system 2410 includes a bus 2405 or other communication mechanism for communicating information, and a processor 2401 coupled with bus 2405 for processing information. Computer system 2410 also includes a memory 2402 coupled to bus 2405 for storing information and instructions to be executed by processor 2401, including information and instructions for performing the techniques described above. This memory may also be used for storing temporary variables or other intermediate information during execution of instructions to be executed by processor 2401. Possible implementations of this memory may be, but are not limited to, random access memory (RAM), read only memory (ROM) (when not storing temporary variables or other intermediate information), or both. A storage device 2403 is also provided for storing information and instructions. Common forms of storage devices include, for example, a hard drive, a magnetic disk, an optical disk, a CD-ROM, a DVD, a flash memory, a USB memory card, a solid state drive, or any other medium from which a computer can read. Storage device 2403 may store source code, binary code, or software files for performing the techniques or embodying the constructs above, for example.

Computer system 2410 may be coupled via bus 2405 to a display 2412, such as a cathode ray tube (CRT) or liquid crystal display (LCD), for displaying information to a computer user. An input device 2411 such as a keyboard and/or mouse is coupled to bus 2405 for communicating information and command selections from the user to processor 2401. The combination of these components allows the user to communicate with the system. In some systems, bus 2405 may be divided into multiple specialized buses.

Computer system 2410 also includes a network interface 2404 coupled with bus 2405. Network interface 2404 may provide two-way data communication between computer system 2410 and the local network 2420. The network interface 2404 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 2404 sends and receives electrical, electromagnetic, or optical signals that carry digital data streams representing various types of information.

Computer system 2410 can send and receive information, including messages or other interface actions, through the network interface 2404 to an Intranet or the Internet 2430. In the Internet example, software components or services may reside on multiple different computer systems 2410 or servers 2431, 2432, 2433, 2434 and 2435 across the network. A server 2431 may transmit actions or messages from one component, through Internet 2430, local network 2420, and network interface 2404 to a component on computer system 2410.

The computer system and network 2400 may be configured in a client server manner. For example, the computer system 2410 may implement a server. The client 2415 may include components similar to those of the computer system 2410.

More specifically, as described above, the client 102 (see FIG. 3) may be implemented by the client 2415. The application server 104 may be implemented by the server 2431. The legacy database system 106 (see FIG. 1) may be implemented by the server 2432. The new database system 110 may be implemented by the server 2432. The connector program 108 may be executed by the server 2431. Alternatively the connector program 108 may be implemented by the server 2435, or by another device (not shown) between the device that implements the application server 104 (e.g., the server 2431) and the device that implements the new database system 110 (e.g., the server 2432). In a testing environment, a single device (e.g., the computer system 2410) may implement one or more (even all) of the client 102, the application server 104, the legacy database system 106, the connector program 108, and the new database system 110.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method of connecting legacy database applications and new database systems, comprising:

storing, by an application server, a legacy database application, wherein the legacy database application is configured to interface with a legacy database system, wherein the legacy database application includes a plurality of SQL (structured query language) scripts, and wherein the plurality of SQL scripts are written in an open SQL format;

implementing, by the application server, a configuration table and a shared memory area;

receiving, by the application server, a selected SQL script, selection parameters, and a database parameter, wherein the selected SQL script is one of the plurality of SQL scripts, and wherein the database parameter indicates one of the legacy database system and a new database system;

storing, by the application server in the configuration table, the selected SQL script, the selection parameters and an identifier, wherein the identifier uniquely identifies the selected SQL script and the selection parameters;

connecting, by a connector program, to the application server when the database parameter indicates the new database system;

reading, by the connector program, the selected SQL script and the selection parameters according to the identifier;

processing, by the connector program, the selected SQL script to generate a parsed SQL script, wherein the processing parses the open SQL format to a new format, wherein the new format is used by the new database system;

executing, by the connector program, the parsed SQL script using the selection parameters to extract data from the new database system;

writing, by the connector program, the data from the new database system into the shared memory area using the identifier; and displaying, by the application server, the data from the new database system in the shared memory area according to the identifier.

2. The method of claim 1, further comprising:
connecting, by the application server, to the legacy database system when the database parameter indicates the legacy database system.

3. The method of claim 1, further comprising:
connecting, by the application server, to the legacy database system when the database parameter indicates the legacy database system;
executing, by the application server, the selected SQL script using the selection parameters to extract second data from the legacy database system.

4. The method of claim 1, further comprising:
connecting, by the application server, to the legacy database system when the database parameter indicates the legacy database system;
executing, by the application server, the selected SQL script using the selection parameters to extract second data from the legacy database system; and
writing, by the application server, the second data from the legacy database system into the shared memory area using the identifier.

5. The method of claim 1, further comprising:
communicating, by the application server to the connector program, that the selected SQL script and the identifier have been stored in the configuration table.

6. The method of claim 1, wherein the new database system has an Open Database Connectivity (ODBC) interface.

7. The method of claim 1, wherein the new database system has a Java™ Database Connectivity (JDBC) interface.

8. The method of claim 1, wherein the data from the new database system is displayed to a first user, further comprising:
displaying, by the application server, the data from the new database system in the shared memory area to a second user according to the identifier, without again extracting the data from the new database system.

9. A system for connecting legacy database applications and new database systems, comprising:
an application server that is configured to store a legacy database application, wherein the legacy database application is configured to interface with a legacy database system, wherein the legacy database application includes a plurality of SQL (structured query language) scripts, and wherein the plurality of SQL scripts are written in an open SQL format;
a new database system, wherein the application server is configured to operate with the legacy database system but not the new database system; and
a connector program,
wherein the application server is configured to implement a configuration table and a shared memory area,
wherein the application server is configured to receive a selected SQL script, selection parameters, and a database parameter, wherein the selected SQL script is one of the plurality of SQL scripts, and wherein the database parameter indicates one of the legacy database system and the new database system,
wherein the application server is configured to store, in the configuration table, the selected SQL script, the selection parameters and an identifier, wherein the identifier uniquely identifies the selected SQL script and the selection parameters,
wherein the connector program is configured to connect to the application server when the database parameter indicates the new database system,
wherein the connector program is configured to read the selected SQL script and the selection parameters according to the identifier,
wherein the connector program is configured to process the selected SQL script to generate a parsed SQL script, wherein the processing parses the open SQL format to a new format, wherein the new format is used by the new database system,
wherein the connector program is configured to execute the parsed SQL script using the selection parameters to extract data from the new database system,
wherein the connector program is configured to write the data from the new database system into the shared memory area using the identifier, and
wherein the application server is configured to display the data from the new database system in the shared memory area according to the identifier.

10. The system of claim 9, wherein the application server is configured to connect to the legacy database system when the database parameter indicates the legacy database system.

11. The system of claim 9, wherein the application server is configured to connect to the legacy database system when the database parameter indicates the legacy database system; and
wherein the application server is configured to execute the selected SQL script using the selection parameters to extract second data from the legacy database system.

12. The system of claim 9, wherein the application server is configured to connect to the legacy database system when the database parameter indicates the legacy database system;
wherein the application server is configured to execute the selected SQL script using the selection parameters to extract second data from the legacy database system; and
wherein the application server is configured to write the second data from the legacy database system into the shared memory area using the identifier.

13. The system of claim 9, wherein the application server is configured to communicate, to the connector program, that the selected SQL script and the identifier have been stored in the configuration table.

14. The system of claim 9, wherein the data from the new database system is displayed to a first user; and
wherein the application server is configured to display the data from the new database system in the shared memory area to a second user according to the identifier, without again extracting the data from the new database system.

15. A non-transitory computer readable medium storing instructions to control a computer system for connecting legacy database applications and new database systems, comprising:
an application server component that is configured to control an application server to store a legacy database application, wherein the legacy database application is configured to interface with a legacy database system, wherein the legacy database application includes a plurality of SQL (structured query language) scripts, and wherein the plurality of SQL scripts are written in an open SQL format; and
a connector program component, wherein the application server component is configured to control the application server to operate with the legacy database system but not a new database system, wherein the application server component is configured to control the application server to implement a configuration table and a shared memory area, wherein the application server component is configured to control the application server to receive a selected SQL script, selection parameters, and a database parameter, wherein the selected SQL script is one of the plurality of SQL scripts, and wherein the database parameter indicates one of the legacy database system and the new database system, wherein the application server component is configured to control the application server to store, in the configuration table, the selected SQL script, the selection parameters and an identifier, wherein the identifier uniquely identifies the selected SQL script and the selection parameters;

wherein the connector program component is configured to control the connector program to connect to the application server when the database parameter indicates the new database system, wherein the connector program component is configured to control the connector program to read the selected SQL script and the selection parameters according to the identifier, wherein the connector program component is configured to control the connector program to process the selected SQL script to generate a parsed SQL script, wherein the processing parses the open SQL format to a new format, wherein the new format is used by the new database system, wherein the connector program component is configured to control the connector program to execute the parsed SQL script using the selection parameters to extract data from the new database system, wherein the connector program component is configured to control the connector program to write the data from the new database system into the shared memory area using the identifier, and wherein the application server component is configured to control the application server to display the data from the new database system in the shared memory area according to the identifier.

16. The non-transitory computer readable medium of claim 15, wherein the application server component is configured to connect to the legacy database system when the database parameter indicates the legacy database system.

17. The non-transitory computer readable medium of claim 15, wherein the application server component is configured to connect to the legacy database system when the database parameter indicates the legacy database system; and
wherein the application server component is configured to execute the selected SQL script using the selection parameters to extract second data from the legacy database system.

18. The non-transitory computer readable medium of claim 15, wherein the application server component is configured to connect to the legacy database system when the database parameter indicates the legacy database system;
wherein the application server component is configured to execute the selected SQL script using the selection parameters to extract second data from the legacy database system; and
wherein the application server component is configured to write the second data from the legacy database system into the shared memory area using the identifier.

19. The non-transitory computer readable medium of claim 15, wherein the application server component is configured to communicate, to the connector program component, that the selected SQL script and the identifier have been stored in the configuration table.

20. The non-transitory computer readable medium of claim 15, wherein the data from the new database system is displayed to a first user; and
wherein the application server component is configured to display the data from the new database system in the shared memory area to a second user according to the identifier, without again extracting the data from the new database system.

* * * * *